United States Patent [19]
Nakashima et al.

[11] Patent Number: 5,276,815
[45] Date of Patent: Jan. 4, 1994

[54] INPUT AND OUTPUT PROCESSING SYSTEM FOR A VIRTUAL COMPUTER

[75] Inventors: Yasuhiko Nakashima; Yoshifumi Ogi, both of Kawasaki, Japan

[73] Assignee: Fujitsu Limited, Kawasaki, Japan

[21] Appl. No.: 928,180

[22] Filed: Aug. 14, 1992

Related U.S. Application Data

[63] Continuation of Ser. No. 426,037, Oct. 24, 1989, abandoned.

[30] Foreign Application Priority Data

Oct. 24, 1988 [JP] Japan .................. 63-267529
Mar. 14, 1989 [JP] Japan .................. 1-059628

[51] Int. Cl.⁵ .................. G06F 13/10; G06F 13/24
[52] U.S. Cl. .................. 395/275; 364/228.2; 364/262.4; 364/238.3; 364/DIG. 1
[58] Field of Search .............. 395/200, 275, 800, 425, 395/650, 325, 400; 364/131

[56] References Cited

U.S. PATENT DOCUMENTS

| | | | |
|---|---|---|---|
| 4,253,145 | 2/1981 | Goldberg | 364/200 |
| 4,533,996 | 8/1985 | Hartung et al. | 364/200 |
| 4,860,190 | 8/1989 | Kaneda et al. | 364/200 |
| 4,885,681 | 12/1989 | Umeno et al. | 364/200 |
| 4,887,202 | 12/1989 | Tanaka et al. | 364/200 |
| 4,901,231 | 2/1990 | Bishop et al. | 364/200 |
| 4,914,619 | 4/1990 | Harris et al. | 364/900 |
| 4,975,836 | 12/1990 | Hirosawa et al. | 364/200 |
| 5,077,654 | 12/1991 | Ohtsuki | 395/800 |
| 5,088,031 | 2/1992 | Takasaki et al. | 395/400 |
| 5,101,346 | 3/1992 | Ohtsuki | 395/800 |
| 5,109,489 | 4/1992 | Umeno et al. | 395/275 |
| 5,165,020 | 11/1992 | Sudama et al. | 395/200 |

FOREIGN PATENT DOCUMENTS

| | | | |
|---|---|---|---|
| 0150039 | 7/1985 | European Pat. Off. | G06F 13/10 |
| 0213952 | 3/1987 | European Pat. Off. | G06F 13/10 |

OTHER PUBLICATIONS

European Search Report, The Hague, search completed Jan. 31, 1992 (Application No. EP 89 31 0954).

*Primary Examiner*—Michael R. Fleming
*Assistant Examiner*—Gopal C. Ray
*Attorney, Agent, or Firm*—Staas & Halsey

[57] ABSTRACT

A virtual computer system has a plurality of virtual computers and a virtual computer monitor for monitoring the virtual computers and for providing translation information describing the relationship between a virtual identification of the input/output apparatus structure to be recognized by the virtual computers and a physical identification to be actually used by the input/output apparatus structure. A hardware dynamically creates a subchannel necessary for performing an input/output process of the virtual computers and translation information when the virtual computer monitor provides the translation information to the hardware. The hardware translates the virtual identification to the physical identification based on the translation information when the virtual computer issues the input/output instruction, and for identifying the subchannel, thereby performing the input/output process. The hardware also translates the physical identification of the control block to a virtual identification to be used by the virtual computer when an input/output interruption is generated, by using the subchannel by the input/output apparatus, thereby providing an input/output interruption to the virtual computer.

12 Claims, 15 Drawing Sheets

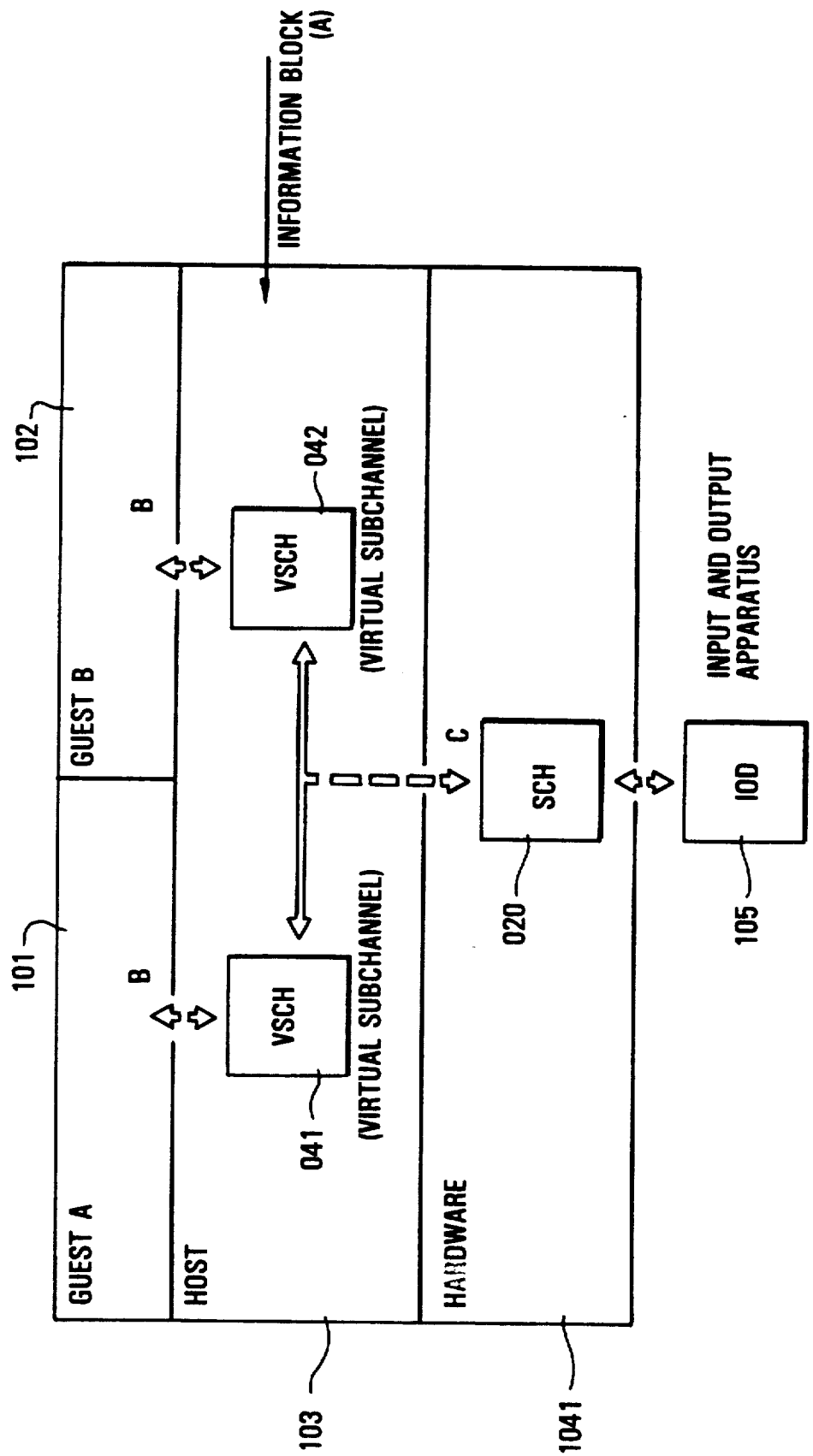
FIG. IA
PRIOR ART

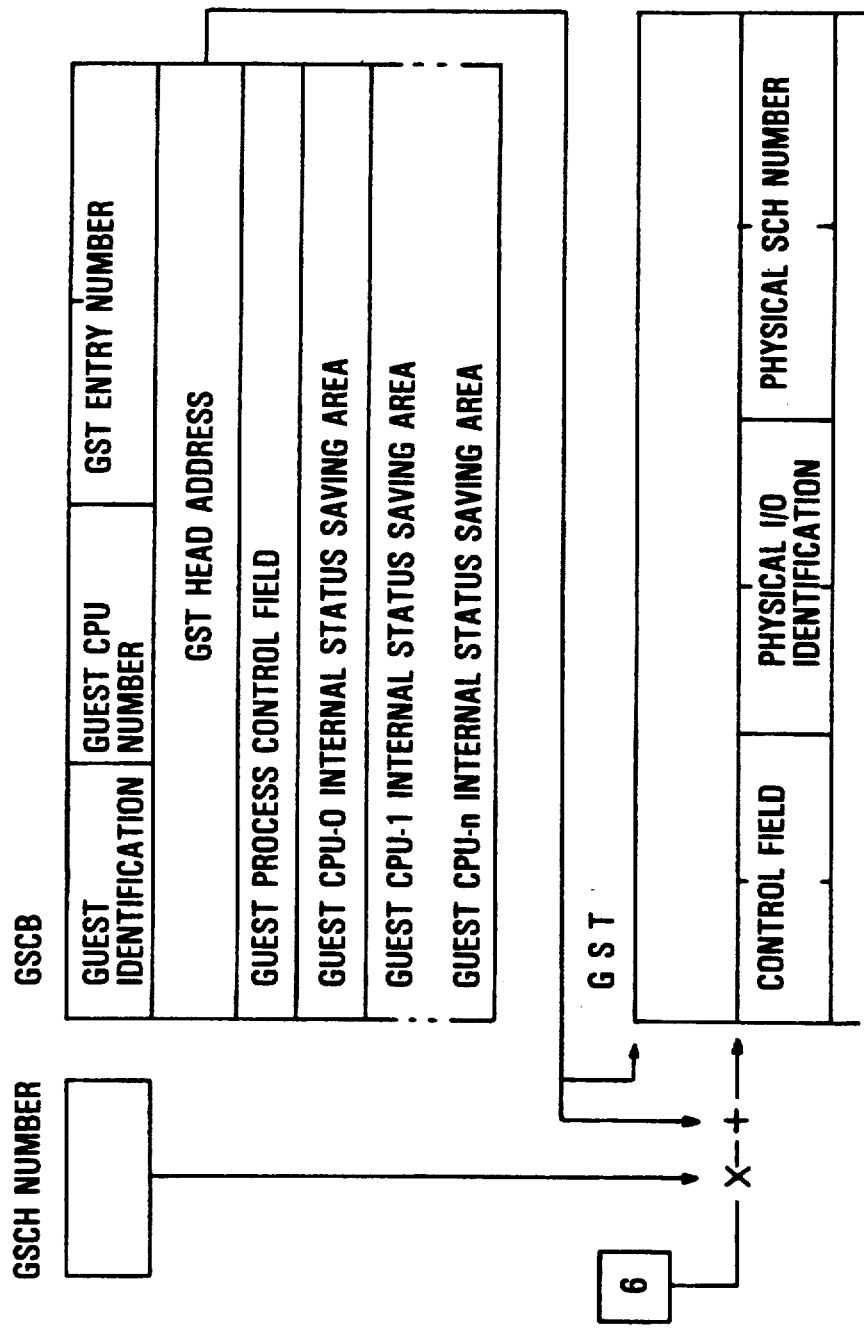

FIG. 7

GUEST SUBCHANNEL TRANSLATION TABLE (GST)

| CONTROL FIELD | PHYSICAL I/O IDENTIFICATION | PHYSICAL SUBCHANNEL |
|---|---|---|

FIG. 9

GSCB (GUEST STATE CONTROL BLOCK)

| GUEST IDENTIFICATION | GUEST CPU NUMBER | GST ENTRY NUMBER | GST HEAD ADDRESS | GUEST PROCESS CONTROL FIELD | GUEST CPU-0 INTERNAL STATUS SAVING AREA | GUEST CPU-1 INTERNAL STATUS SAVING AREA | ... | GUEST CPU-n INTERNAL STATUS SAVING AREA |
|---|---|---|---|---|---|---|---|---|

FIG. 11

SUBCHANNEL FORMAT

| LOCK BYTE | INTERNAL STATUS DISPLAY | | U A |
|---|---|---|---|
| FORWARD QUEUE POINTER | | BACKWARD QUEUE POINTER | |
| GUEST IDENTIFICATION | CONNECTION PATH INFORMATION | PATH GROUP NUMBER | |
| OPERATING MODE DESIGNATING INFORMATION | | | |
| CCW ADDRESS INFORMATION | | | |
| DAT INFORMATION | | | |

INPUT AND OUTPUT PROCESSING SYSTEM FOR A VIRTUAL COMPUTER

This application is a continuation of application Ser. No. 07/426,037, filed Oct. 24, 1989, now abandoned.

BACKGROUND OF THE INVENTION

The present invention relates to an input/output processing system of a plurality of virtual computers in a virtual computer system.

The fundamental function of an OS is to efficiently and advantageously utilize hardware resources such as CPU, main storage, secondary memory and input/output devices. Therefore, the OS multiplexes hardware resources and produces a required number of virtual resources in a virtual manner, thereby allowing respective users to use a computer as if they had their own hardware resources such as a plurality of CPUs. The multiplexing method comprises a time sharing method, namely, a method of assigning resources to divided times, and a space sharing method, namely, a method of assigning resources to divided areas. The hardware resources are multiplexed to be reformed in a usable state and to correspond to the virtual resources.

Such a virtual computer system should provide the same functions and environment as a real computer. Thus, it should prevent a user from recognizing that the computer is running under the guest environment and provide a guest environment for coupling a plurality of virtual computers (herein called guests) including a plurality of CPUs.

This is also applied to the input and output processes.

Generally speaking, in a virtual computer system, a real input and output apparatus structure recognized by a virtual computer monitor (called a host) for performing a management of resources has a different structure from that of the virtual input and output apparatus to be recognized by the guest.

To enable a plurality of guests to run concurrently on the real computer, only a portion of a physical input and output apparatus structure (guest subchannel) is shown to the guest. Furthermore, a virtual identification (B) of the input and output apparatus resources (virtual subchannel number) is different from a physical identification (C) (subchannel number) in the physical input and output apparatus structure.

To prevent the guest from recognizing this difference, all the input and output instructions it issues are obtained in the prior art virtual computer system by the host and the virtual identification (B) (guest subchannel number) of the above input and output apparatus resources constituting the input and output instruction operand is translated to a physical identification (C) (subchannel number) in a structure of a physical input and output apparatus. Then the input and output environment is ensured by the guest by enabling the host to issue the input and output instruction. Namely, even if the physical input and output apparatus is busy, it is seen by the guest as if the guest were using the input and output apparatus. This is also applied to a function of the input and output process.

An object of a virtual computer is to enable softwares of a different architecture to run on a single hardware (real computer). As the control information is co-owned by several guests, the input and output process, which includes an asynchronizing operation, cannot absorb the differences in the architecture on the hardware side. Thus, a host with control information corresponding to respective guests performs an emulation, thereby absorbing the difference.

In the prior art virtual computer system, all the input and output processes in a guest are normally obtained by a host. This naturally decreases its capability. This deterioration may exceed 20 percent. Further, in the prior art virtual computer system, the control information (subchannel information) within a hardware does not correspond with the guest. Thus, it is necessary for the host to always judge to which guest the input and output event occurring in a certain hardware source should be reported, causing the control logic for the input and output apparatus of the host to be complicated and thus increasing the host's overhead.

Therefore, it is necessary to provide an input and output control system which can increase the capability of a virtual computer system by minimizing host overhead.

FIGS. 1A and 1B show an input and output processing system in a conventional virtual computer system. FIG. 1A shows a model of the functional assignment in the conventional virtual computer system and FIG. 1B shows an example of the structure. In FIG. 1A, guests 101 and 102 are provided to host 103.

In the conventional virtual computer system, all the input and output processes are conducted through host 103 and the guest input and output instruction for virtual subchannels (VSCH) 041 and 042 corresponding to the processing object viewed from guests 101 and 102 can be replaced by the input and output instruction having physical subchannel (SCH) 020 as its object through an operand translation.

What is reported by using the above physical subchannel (SCH) 020 upon issuing the guest input/output interruption is reflected on the virtual subchannels (VSCH) 041 and 042 by host 103 and reported to individual guests 101 and 102.

Virtual subchannels (VSCH) 041 and 042 within host 103 provide control information for achieving an input and output environment from the viewpoint of respective guests 101 and 102. In the conventional system, this control information exists within host 103 and the content reported by the hardware 1041 (for example, provided within memory control apparatus (MCU) 202) through physical subchannel (SCH) 020 is interpreted by host 103 to be reflected on guest 101 or 102.

The physical subchannel (SCH) 020 is an actual subchannel which hardware 1041 has inside thereof. Even if the physical input/output apparatus (IOD) 105 has a plurality of physical input/output addresses, only one physical subchannel (SCH) 020 is obtained in correspondence with one physical input/output apparatus (IOD) 105 in the prior art.

The above explains the functional assignment in an input/output process in the prior art virtual computer system. This process will be explained in detail by referring to FIG. 1B.

At first, the structure of the conventional virtual computer system is explained.

Guest A 101, guest B 102 and the host are arranged in main storage unit (MSU) 203 on the real computer, as shown in FIG. 1B. The virtual subchannels (called VSCH hereinafter) 041 and 042 in host 103 is a virtual subchannel corresponding to the above individual guests A and B 101 and 102. It does not recite a state of the actual input/output apparatus but the input/output apparatus viewed from guests 101 and 102. Upon an interruption of an input/output operation to the guest, the guest subchannel number (virtual identification (B)) for reporting the interruption to individual guests 101 and 102 is also recited therein.

The guest subchannel translation tables (hereinafter called GST) 214 and 215 are for performing a translation between said guest subchannel number (a virtual identification (B)) and the physical subchannel number (physical identification (C)). The host uses the table when the guest input and output instruction is issued, enabling the guest subchannel number to be translated to a physical subchannel number.

Virtual address translation table 216 (hereinafter called VATT) within host 103 is for obtaining VSCH 212 or 213 based on the subchannel number of physical subchannel 020 transmitted from hardware 1041 and the information designating which path is used among paths connected to the device when an input/output interruption is initiated for input/output apparatus (IOD) 105.

Address translation table (ATT) 207 is provided in input/output processor (IOP) 206. It is an indexing structure for translating the physical input/output address, namely, the input/output apparatus address including the data transmission (communication) path to the subchannel number, and is usually formed by a high speed memory provided within input/output processor (IOP) 206. In the example shown in FIG. 1B, the translation structure operates to point to the same value, namely, subchannel (SCH) 020, regardless of whether or not input/output apparatus (IOD) 105 communicates with the body apparatus side by using either of channels (CHE) 208 or 209.

In a virtual computer system constructed as above, the operation of an input/output process event is explained as follows.

(a) Upon the guest input and ouput instruction execution:

(1) Guest input/output instructions are obtained by host 103 by a program corresponding to the guest executed by central processing unit (CPU) 201.

Host 103 converts an operand of the guest input/output instruction to the GST (for example 214) corresponding to guest 101 or 102, to obtain the corresponding physical subchannel number (physical identification (C)).

(2) Host 103 checks whether or not subchannel (SCH) 020 corresponding to the physical subchannel number obtained in the above is used by an input/output process by other guests. Namely, it is necessary for host 103 to manage the state of all the subchannels (SCH) 020.

(3) Where the in-use condition does not exist as a result of the check, host 103 issues an input/output instruction to subchannel (SCH) 020.

Then, instruction data is added, which designates that only the input/output path assigned to corresponding guest 101 or 102 can be used. For example, the path which can presently be used for the input/output process comprises only a path of channel (CHE) 208, input-/output control appartus (IOC) 210, input/output apparatus (IOD) 105.

(b) Upon a guest input and output interruption:

(1) Hardware 1041 obtains subchannel (SCH) 020 corresponding to input/output apparatus (IOD) 105 and reports the condition of the input/output interruption by using ATT 207. By using this subchannel (SCH) 020, it interrupts host 103 together with the data representing a path in which the input/output interruption condition is produced, for example, the data designating channel (CHE) 208, input/output control apparatus (IOC) 210, and input/output apparatus (IOD) 105.

(2) Host 103 selects a virtual subchannel (VSCH) 041 based on the physical subchannel number of subchannels (SCH) 020 and which path is used, by using VATT 216. The interruption report is performed for guests 101 and 102 after the input and output interruption condition is recited in VSCH 041.

As recited above, in the conventional system, it is necessary for all the guest input/output processes to be performed by host 103 regardless of whether they are input/output instructions or input and output interruptions. Therefore, there is a problem that the overhead of host 103 is increased.

In the existing virtual computer system, the host provides a virtual interruption mask and an interruption queue for every logical CPU and a hardware interruption mask is made to correspond in a time divisional manner to the virtual interruption mask. Therefore, the interruption condition from the input/output apparatus is distributed to respective logical CPUs.

The above prior art system will be further explained by referring to the drawings.

FIG. 2 shows the general structure of the input/output interruption of the prior art virtual computer system. It comprises a host 301, guests 302 and 303, hardware 304, logical CPUs 321, 322, 331 and 332, virtual interruption mask 421, 422, 431 and 432, hardware interruption masks 340 and subchannel 305.

Respective virtual interruption masks 421, 422, 431 and 432 are provided for logical CPUs 321, 322, 331 and 332 of guests 302 and 303. The content of the hardware interruption mask 340 is made to correspond to these respective virtual interruption masks in a time divisional manner, thereby enabling the interruption condition from the input/output apparatus to be recognized by respective logical CPUs.

These controls are conducted by the host. Namely, the conventional virtual computer system requires that all the input/output interruptions be distributed by the host. A host makes hardware interruption mask 340 is made to correspond, in a time divisional manner, to virtual interruption masks 421 to 432, which are viewed from the respective logical CPUs of the guest and distributes the input/output interruption for respective logical CPUs.

FIG. 3 shows the interruption control of the virtual computer system. The same portions as in FIG. 2 are designated by the same reference numbers. Virtual interruption masks 411, 421 and 422 are provided to respective logical CPUs and respective bits are made to correspond to the interruption request from different input/output apparatuses. Therefore, the interruption from the input/output apparatus is received only when the value of a bit is "1".

Respective mask bits of hardware interruption mask 340 correspond to interruption requests from different input/output apparatuses and the bit position is made to correspond to the respective virtual interruption masks on a one-to-one basis. The bit pattern of the mask is the same as the bit pattern of the virtual interruption mask corresponding to the logical CPU which is running on the current physical CPUs, and input/output interruption is received only when the bit value is "1".

The interruption report destination 350 describes the report destination CPU of the input/output interruption. The logical CPU which initiates the subchannel is selected as the destination report logical CPU.

The operations upon setting of the virtual interruption mask and/or upon the generation of the guest input/output interruption will be explained.

(a) Upon setting of the virtual interruption mask:

(1) The guest logical CPU-c designated by the reference number 321 determines the virtual interruption mask 421 as necessary. By making the value of the bit (for example i01) corresponding to the input/output apparatus "1", the interruption request from the subchannel 305 corresponding to the input/output apparatus can be received. The interruption report destination C in the subchannel is described.

(2) The host 301 reflects the most recent virtual interruption masks 411 to 422 on hardware interruption mask 340 in a time divisional manner to prepare for the input/output interruption.

(3) When a certain guest logic CPU (for example 322) is dispatched to a different physical CPU, the virtual interruption mask 422 corresponding to the guest logical CPU is reflected on the hardware interruption mask by a host which runs on a different physical CPU.

(b) Upon the issuance of the guest input/output interruption:

(1) When the interruption condition is produced by the input/output apparatus and the corresponding bit (for example i01) of the hardware interruption mask 340 is "1", the input/output interruption condition is reported to the host.

(2) The bit value alone (content of the respective i01) of the virtual interruption masks of 411 to 422 cannot determine which logical CPU should receive the report of the input/output interruption. The host determines the report destination C based on the interruption report destination 350 in the subchannel 305 corresponding to the input/output apparatus, which produces the input/output interruption, and reports the input/output interruption condition to the logical CPU-c.

In the prior art virtual computer system, all the correspondence between the virtual interruption mask and the hardware interruption mask is managed by the host and the input/output interruption is distributed in accordance with the report destination.

Therefore, the overhead increases and the host's load also increases, affecting the processing capability of the system.

In order to decrease the host's, the hardware interruption mask is made to correspond to respective logical CPUs. However, this results in an increase in the hardware amount, making the system less economical.

SUMMARY OF THE INVENTION

An object of the present invention is to provide a virtual computer control system capable of decreasing the overhead necessary for the input/output processes in a virtual computer monitor (host) in the input/output process of respective virtual computers in a virtual computer system.

Another object of the present invention is to provide a control system which can decrease the load of a host without increasing the amount of hardware required for the hardware interruption mask.

A feature of the present invention resides in a virtual computer control system having an information block describing an input/output apparatus structure to be provided to a plurality of virtual computers, comprising virtual computer monitor means for monitoring said virtual computers and for providing translation information describing the relationship between a virtual identification of the input/output apparatus structure to be recognized by said virtual computers and a physical identification to be actually used by said input/output apparatus structure, hardware means for dynamically obtaining a within-hardware control block group necessary for performing an input/output process of said virtual computers based on said information block and translation information when said virtual computer monitor means provides said translation information to said hardware means, hardware means for translating the virtual identification included in an operand of the input/output instruction issued by the respective virtual computers to the physical identification based on the translation information when the virtual computer issues the input/output instruction, and for identifying one control block of the within-hardware control block group, thereby performing the input/output process using said control block, hardware means for translating the physical identification of said control block to a virtual identification to be used by the virtual computer when an input/output interruption is generated, by using the within-hardware control block by the input/output apparatus, thereby providing an input/output interruption to the virtual computer using the virtual identification.

Another feature of the present invention resides in an input/output control system for use in the virtual computer system for managing the hardware input/output interruption of the floating interruption by the firmware or the software operated by the CPU comprising means for putting the bit corresponding to the logical CPU within the hardware interruption mask of the physical CPU into an enable state when respective bits of the interruption mask of a hardware are made to correspond to respective logical CPUs and the logical CPUs operates, and means for rewriting the relationship information with the logical CPU to be written into respective subchannels to the relationship information corresponding to the logical CPU which most recently executes the mask bit change operation capable of receiving the interruption condition from the subchannel.

BRIEF DESCRIPTION OF THE DRAWINGS

FIGS. 1A and 1B are block diagrams showing the input and output process system in the prior art virtual computer system, FIG. 6A is a view for explaining the operation of the GSCH number to the physical SCH number, FIG. 7 shows the format of a GST, FIG. 9 shows the data structure of a GSTB as an operand of the STUPG instruction.

FIG. 11 shows the format of a subchannel of the present invention,

DETAILED DESCRIPTION OF THE PREFERRED EMBODIMENT

Figure 1B:
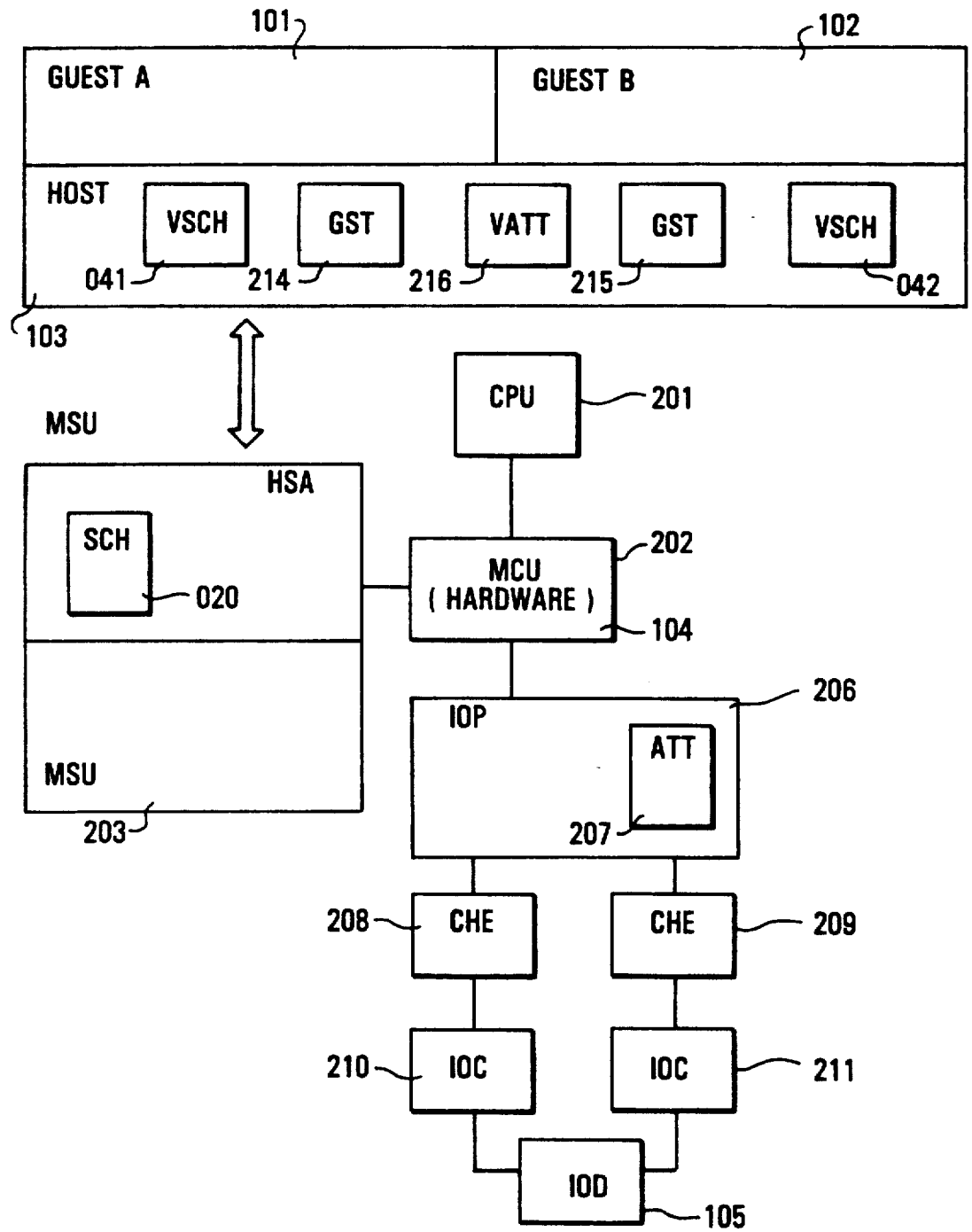

An embodiment of the present invention will be explained in detail by referring to the drawings.

Figure 4:
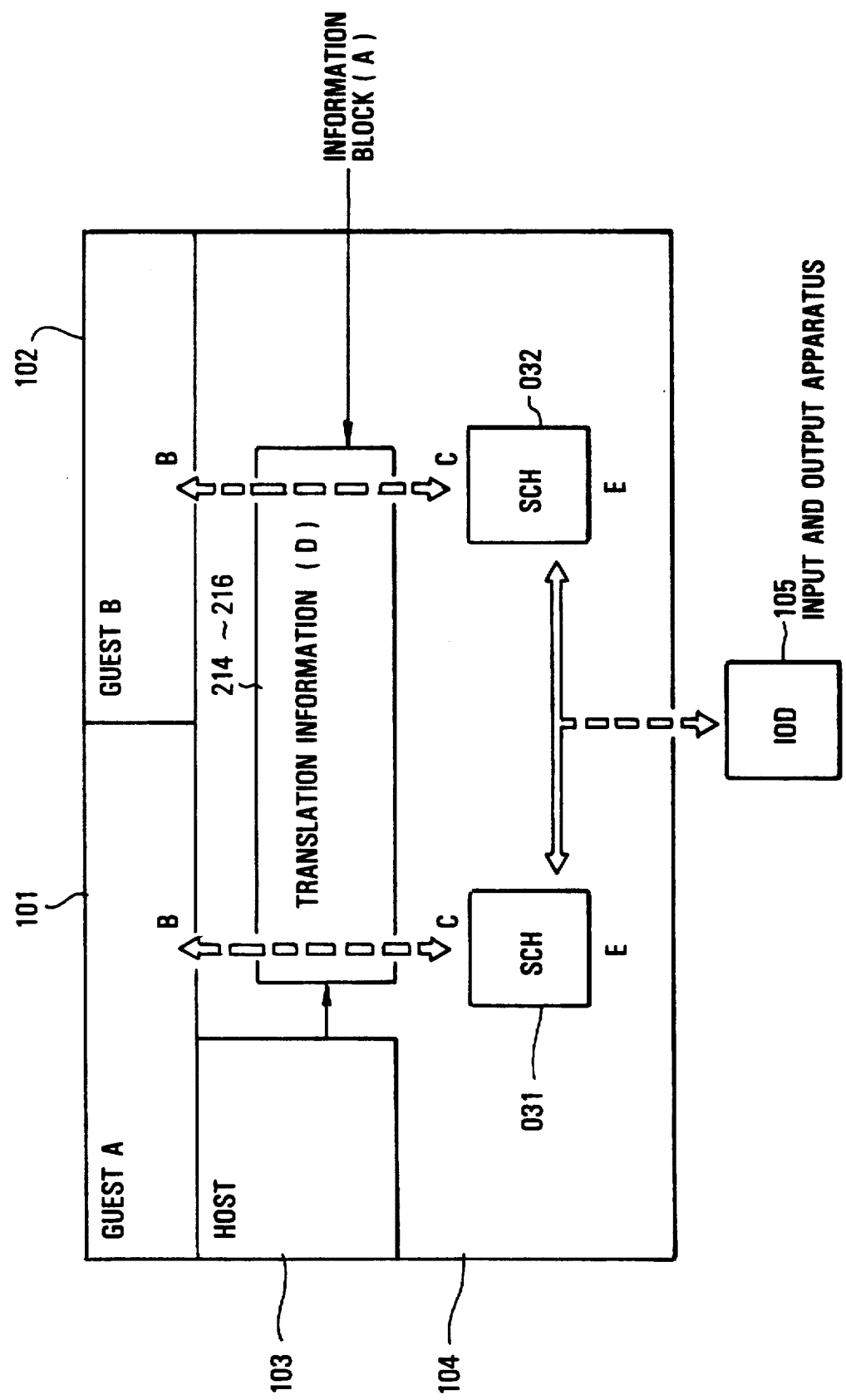
FIG. 4 is a principle block diagram of the virtual computer control system according to the present invention.

FIG. 4 shows a principle block diagram of the present invention.

Information block (A) describes the structure of an input/output apparatus to be provided to a plurality of virtual computers 101 and 102 which operate on a virtual computer system. This information relates to which guest uses which input/output apparatus.

Virtual computer monitor (host) 103 of a virtual computer system provides to hardware 104 translation information (D) 214 and 216 describing a relation between the virtual identification (B) (guest subchannel number) of an input/output apparatus structural unit recognized by respective virtual computers 101 and 102 and physical identification (C) (subchannel number) to be actually used by hardware 104. Then, hardware 104 itself dynamically obtains within-hardware control block group (E) 031 and 032 necessary for executing an input/output process of respective virtual computers 101 and 102 based on said information block (A) and said translation information (D) 214 and 216. Where virtual computers 101 and 102 issue an input/output instruction, hardware 104 translates virtual identification (B) included in an operand of the input/output instruction issued by said virtual computer based on the translation information (D) 214, and identifies a member of the corresponding within-hardware control block group (E) 031 and 032 to execute said input and output instruction using said within-hardware control block.

Where an input/output interruption is produced by input/output apparatus 105 using a member of said within-hardware control block (E) 031 and 032, hardware 104 translates a physical identification (C) of control block (E) 031 and 032 to virtual identification (B) used by virtual computers 101 and 102 using translation information (D) 214. Thus, the input/output interruption is applied to virtual computers 101 and 102 by using the virtual identification (B).

According to the present invention, in an input/output system in a virtual computer in a virtual computer system, an input/output structure is provided to a plurality of virtual computers (guests) which operate on the virtual computer system. Namely, information block (A) designating which guest uses which input/output apparatuses are designated, for example, by a user. Then, the host, based on information block (A), produces a guest subchannel translation table (GST) for translating the guest subchannel number (virtual identification (B)) recognized by a guest to the physical subchannel number (physical identification (C)) and table (VATT) (translation information (D)) for obtaining the corresponding virtual subchannel (VSCH) based on the host subchannel number and path information trasmitted from the hardware upon an occurrence of an input and output interruption and provides a guest subchannel translation table and the table (VATT) (translation information (D)) to the hardware. Thus, the hardware dynamically obtains the subchannel (SCH) (control block group (E)) necessasry for executing the corresponding guest input/output process, based on the information block (A) and guest subchannel translation table (GST) (translation information (D)).

When the guest produces an input/output instruction by using a member of the within-hardware subchannel group (E), the hardware 104 translates the virtual subchannel number (virtual identification (B)) included in an operand of the input/output instruction issued by the guest to the physical subchannel number (physical identification (C)) by using the guest subchannel translation table (GST) and identifies the subchannel (a member of control block group (E)) within the corresponding hardware, and executes the input/output instruction using the subchannel.

When the input/output interruption is produced by the input/output apparatus (IOD) by using a particular member of within-hardware subchannel group (D), said hardware uses the virtual address translation table (VATT) (translation information (E)) and translates the subchannel number (physical identification (C)) of the subchannel (SCH) to the virtual subchannel number (virtual identification (B)) used by the guest. The hardware produces the input and output interruption in the guest by using the virtual subchannel number.

As stated above, in the present invention, the control information within the hardware, namely, the structure for dynamically opening the subchannel (SCH) corresponding to the guest and the translation structure (GST, VATT) between the guest input/output structure and the physical input/output structure are provided within the hardware. Therefore, the input/output process can be executed without providing the guest input/output process to the host, thereby decreasing the host overhead.

Figure 5:
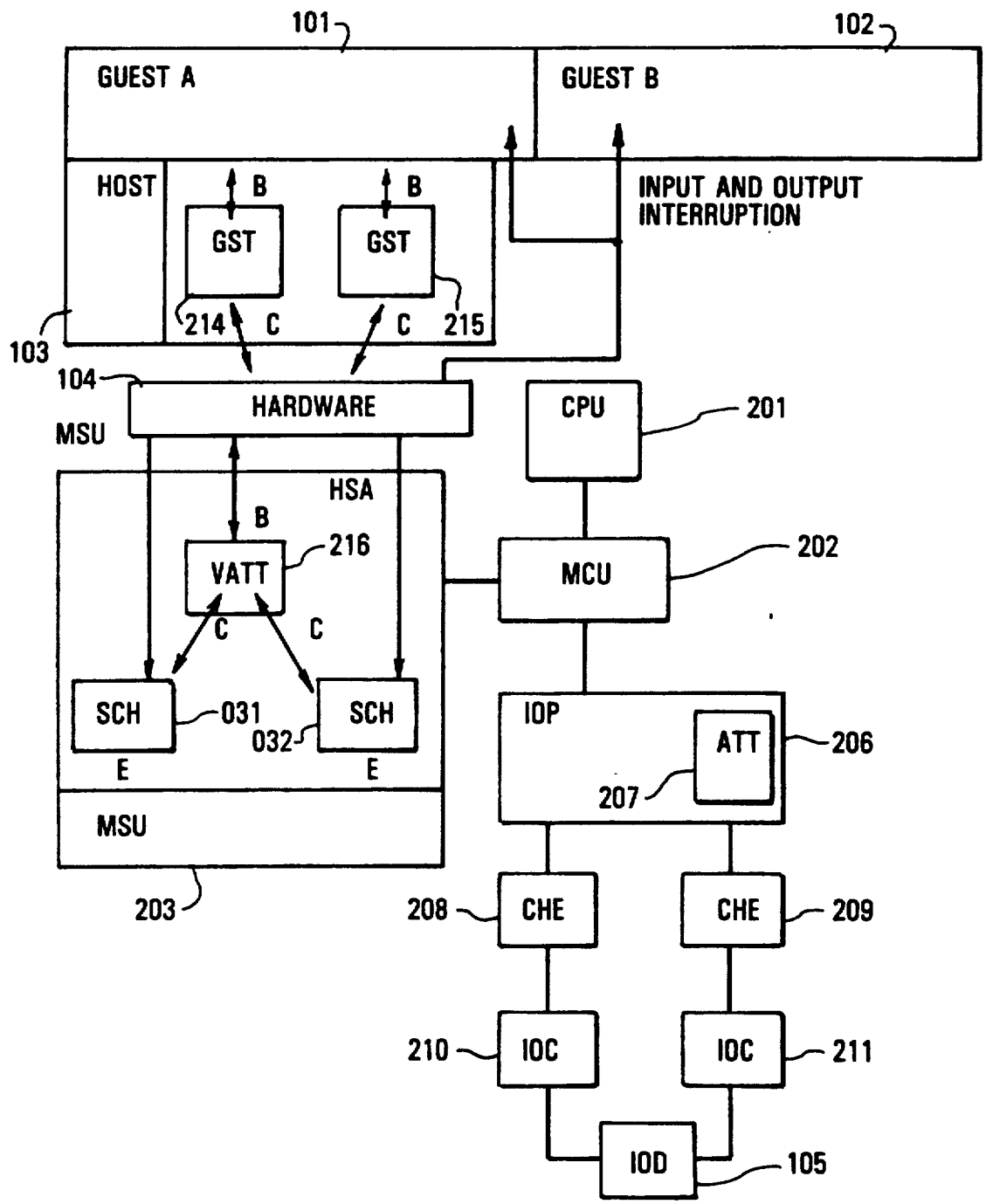
FIG. 5 is a block diagram of an embodiment of the present invention.

FIG. 4 shows the principle of the virtual computer control system of the present invention and FIG. 5 shows an embodiment of the present invention. Information block (A) describes the structure of the input and output apparatus of respective guests 101 and 102 provided by a user. Based on information block (A), hardware 104 dynamically obtains subchannels 031 or 032 to execute the input/output process of guests 101 or 102 when translation information (D) (GST, VATT) 214 and 216, which describes the relation between the guest subchannel number and the physical subchannel number, is provided to hardware 104. In the following step, when an input/output instruction is issued by respective guests 101 or 102, or an input/output interruption is produced from physical input/output apparatus (IOD) 105, hardware 104 executes the input/ouput instruction or produces the virtual input/output interruption to guest 101 or 102 without being operated by host 103, based on the translation information (D) (GST, VATT) 214 and 216. The same reference numbers are applied to the same subjects in all the drawings.

The virtual computer control system of the present invention and particularly the input/ output control system, will be explained, by referring to FIGS. 4 and 5. The hardware structure will be explained as the virtual computer system of the present invention.

A hardware control information block such as subchannel (SCH) 031 or 032 and virtual address translation table (VATT) 216, which can be accessed only by hardware 104, are positioned in an exclusive hardware area or hardware system area (HSA) 205 in main storage unit (MSU) 203.

Subchannels (SCH) 031 and 032 are physical subchannels which correspond to respective guests for respective input/output apparatuses (IOD) 105. Hardware control information block (C) is for controlling an input/output process and control block group (E) determines which guest uses which input/output apparatus (IOD) 105.

Accordingly, if input/output apparatus (IOD) 105 is used by N guests, N subchannels (SCH) 031 or 032 are provided in correspondence with respective guests, for the input/output apparatuses (IOD) 105. Respective subchannels (SCH) 031 or 032 are provided in correspondence with the status of the guests for respective input/output apparatuses (IOD) 105.

An address (including input/output path information) of physical input/output apparatuses (IOD) 105 and the state (such as in-use, in-fault or power thrown-in state) of the input/output apparatuses (IOD) 105 are described from a viewpoint of software in respective subchannels (SCH) 031 and 032.

The physical input and output address used by one subchannel (SCH) 031 or 032 is not currently used by other subchannels.

Virtual address translation table (VATT) 216 is for translating the physical subchannel number (physical identification (C)) to guest subchannel number (virtual identification (B)). When an input/output interruption occurs, the physical subchannel number transmitted from hardware 104 through input/output processor (IOP) 206 is translated to the guest subchannel number by this hardware structure. Address translation table (ATT) 207 translates the physical input/output address to the physical subchannel number in a similar manner to the prior art (FIG. 1). ATT 207 is provided in input/output processor (IOP) 206.

The physical channel numbers obtained by the input/output path are always different. In this embodiment, the output of address translation table (ATT) 207 points to the physical subchannel (SCH) 031 or 032, depending on which of channels (CHC) 208 or 209 is used to communicate with the input/output apparatuses (IOD) 105. The table ATT is an indexing structure formed by a high speed memory provided inside the input/output processor (IOP) 206.

Guest subchannel translation table (GST) 214 is for translating guest subchannel numbers (virtual identification (B)) to physical subchannel numbers (physical identification (C)) and provides an operand of the guest set-up instruction issued by host 103. In this embodiment, GST 214 is provided near host 103 on main storage unit (MSU) 2, in a similar manner to the prior art. The guest subchannel number (virtual identification (B)) of the guest input and output instruction issued by the setup guest 102 or 103 is translated to the physical subchannel number (physical identification (C)) by hardware 104, which refers to table (GST) 214.

FIG. 6A shows a block diagram of an address translating structure used to obtain a physical SCH number from the guest subchannel (GSCH) number by using the hardware of the present invention. Guest state control block (GSCB) is an operand of a setup guest (STUPG) instruction issued by the host. When the setup guest instruction is issued by the host, the hardware memorizes the top address of the GSCB, which is an operand of the instruction. When the guest input/output instruction is issued by the guest, the hardware fetches the head address of the GST associated with the guest using the information contained in GSCB, previously obtained by the action described above, and the identification information of the guest. After that, the hardware adds 6 times the guest subchannel (GSCH) number to the GST head address in the second entry of this GSCB to provide an entry of the GST, thereby enabling the physical subchannel number to be extracted from the entry of the GST. Namely, respective entries of the GST comprise 6 bytes. Therefore, the relative address of respective entries of the GST are obtained by multiplying the GSCH number by 6 when the GST head address is made 0. This address is added to the head address of the GST to provide the GST entry corresponding to the guest. As shown in FIG. 6A, the physical subchannel number and physical I/O identification are stored in the GST. Thus, the physical subchannel number and physical I/O identification can be drawn based on the virtual guest channel number. The hardware of the present invention accesses the table and executes the address translation operation by providing an exclusive sequencer outside the host without using the host.

Figure 6B:
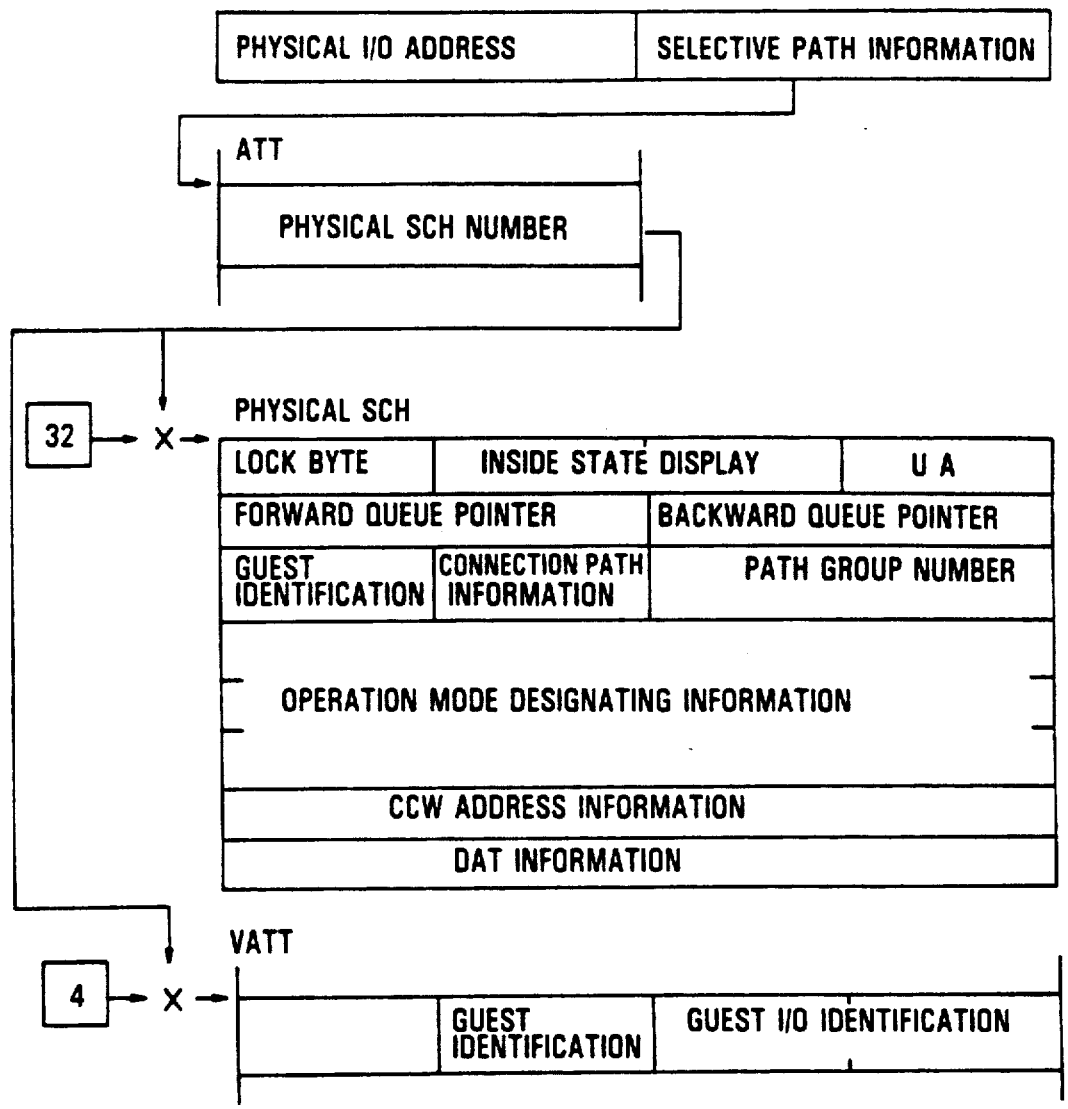
FIG. 6B shows an operation of an interruption generation apparatus for producing guest input/output identification data.

FIG. 6B shows the hardware block diagram for explaining the pointer control for obtaining the guest I/O identification from the interruption generation apparatus identification data in accordance with a route opposite to that shown in FIG. 6A. The hardware shown in FIG. 6B accesses the tables ATT and VATT and translates their addresses by using the interruption generation data comprising the physical I/O address and the selection path data, thereby driving the guest I/O identification out. In FIG. 6B, the interruption generation apparatus identification data is applied to the IOP and drives the physical subchannel number using the ATT table. The head address of the corresponding VATT entry is produced by multiplying the physical subchannel number by 4, thereby drawing the guest identification and guest I/O identification from the VATT. The head address of the VATT is not shown but when a particular head address exists, 4 times the physical channel number is added to the head address to access the VATT. The subchannel can be obtained from the address provided by adding 32 times the physical subchannel number to the head address of the physical subchannel area. The physical subchannel comprises 32 bytes per entry. The interruption generation apparatus identification data is translated to the physical subchannel by the ATT upon an issuance of the I/O interruption and is translated into the guest identification and guest I/O identification in accordance with the hardware control of the present invention.

Next, the entry of respective tables used in FIGS. 6A and 6B will be explained.

In the prior art, the total content of the GST is set by a host. However, in this invention the physical I/O identification is written by hardware 104 when the host issues the guest setup instruction.

The GST converts virtual guest identification (B) to physical I/O identification (C). An example of its format is shown in FIG. 7.

Control field bit 0 . . . An effective flag.

This shows that the physical I/O identification corresponding to guest I/O identification using this entry exists. In the prior art system, when this bit is 0, and the guest I/O instruction using the guest I/O identification corresponding to this entry is issued and the host performs an emulation so that the response code becomes the same as that obtained when the corresponding I/O apparatus does not exist. In this invention a guest I/O instruction is given to the host when the bit is 0. Furthermore, when the bit is 0, data other than this entry have no meaning and thus cannot obtain the subchannel when the guest setup instruction is issued.

Control field bit 1 . . . An I/O instruction-obtaining flag.

When the guest I/O instruction using the guest I/O identification corresponding to this entry as an operand is issued, it is not executed in an ordinary manner, but requires a special process by the host. When this bit is 1, a special process is required for the host. For example, an I/O error is produced for the I/O apparatus co-owned by a plurality of guests. In the prior art, when this bit is "1", a different process from that of the ordinary guest I/O process service routine is initiated. In this embodiment, when this bit is "1", the guest I/O instruction is obtained by the host.

Control field bit 2 . . . An I/O interruption obtaining flag.

This is not used upon an issuance of an I/O instruction. In the prior art system, the host writes it in a VATT and it does not exist in a GST. In the present invention, a VATT exists in an area (HSA) to which an access can be made only by a hardware and is formed by the hardware. A GST is used as input information. This bit is referred to by the hardware upon the guest setting-up process and is copied to the VATT. The details are given in the later description relating to the VATT. Bit 1, for GST entry, and bit 2 are subjected to on/off operations as a pair. If they are not, consistent I/O processing is not ensured from the viewpoint of the guest.

Control field bits 3 to 7 . . . An unused bit

Control field bits 8 to 15 . . . A using path designating field

A corresponding physical apparatus can be combined with the body apparatus to a maximum of 8 I/O paths. The manner of bit to bit correspondence shows which of the 8 paths should be used by this guest. Namely, the I/O apparatus can be commonly used by a plurality of guests if the I/O paths are different. In the prior art, this information is used as an operand (usable path designation information) of the I/O instruction issued by the host and in the present invention, the information is used to enable the hardware to create the required subchannel.

Physical I/O identification,

This defines an apparatus in a system and is, for example, an apparatus number. This field is used to designate which apparatus should actually correspond to the guest I/O apparatus identification corresponding to this entry. In the prior art, as well as in the present invention, this is written by the host. In the present invention, when a STUPG instruction (later described) is issued by the host, the hardware obtains the data of the object apparatus forming the input data of the subchannel for the guest I/O process control to be formed by the data based on the I/O structure data base previously given in the inside. In the prior art, this data is merely a memorandum used for the host to issue a message to the operator.

Physical subchannel number

In the prior art, this is written by the host and is used as operand data where the host issues the I/O instruction to emulate the guest I/O instruction using this entry. In this invention, this is written by the hardware when the host issues a STUPG instruction (later described) and data identifying the physical subchannel newly formed by the hardware to execute the guest I/O instruction or guest I/O interruption which is used by this entry and this is not used by the host.

The GST entry comprises 6 bytes/guest identification in the above example, it is used upon an issuance of a guest I/O instruction in both the present invention and the prior art and is used upon an issuance of a guest setup instruction by the host in the present invention.

In this embodiment, the head address of the GST is transmitted to the hardware by the later described guest setup instruction STUPG (setup guest), and is stored to correspond to the guest. Actually, the head address of the GSCB (guest state control block) of the operand of the STUPG instruction is stored to correspond to the guest. The hardware received by this instruction accesses the GST using this address and forms a VATT corresponding to the guest within HSA.

Upon an issuance of a guest I/O instruction, the host (prior art)/hardware (present invention) adds the GST head address corresponding to the guest to the value of the guest I/O identification $\times 6$ (bytes). This is done to make an access to the GST entry corresponding to the guest I/O identification. When such a designation is given to the address out of the GST in the present invention, the host is obtained. After the state of a guest, such as the program counter of the guest CPU and the internal register, is saved in guest state control block GSCB, the guest CPU identification is obtained by the host as an operand. If such designation is not issued, the host (prior art)/hardware (present invention) fetches the physical subchannel identification recited in the GST entry. In the prior art the path designating data recited in byte 1 of the GST entry is added to the subchannel identification by the host and is used by the host as a part of the operand of the I/O instruction which is issued by it to emulate the guest I/O insturction. In the present invention the hardware has already obtained the subchannel including the path designation data. The physical subchannel identification recited in the GST entry is the identification of the subchannel obtained by the hardware upon an issuance of the STUPG instruction. I/O operation is directly applied to this subchannel.

Figure 8:
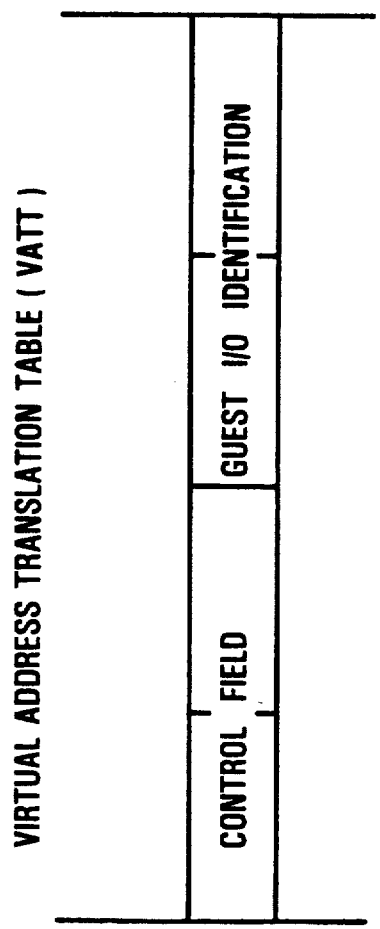
FIG. 8 shows the format of a VATT.

The VATT is a table for converting the physical I/O identification to the virtual guest identification (B) used by the guest. The format of VATT is shown in FIG. 8.

In the prior art, the host forms the VATT, which is used only by the host. In the present invention, the VATT is formed by the hardware using the GST as an input and is only used by the hardware.

The VATT is 4 bytes/entry and an entry is formed corresponding to the physical subchannel.

Control field bit 0 . . . an effective flag.

A guest I/O identification (guest subchannel number) corresponding to this entry exists. Namely, this shows that a guest using the physical subchannel corresponding to this entry exists. When this flag is 0, the I/O interruption is reported to the host. In the prior art, the I/O interruption handler of the host itself is called. However, in this invention, the I/O interruption is obtained by the host.

Control field bit 1 . . . I/O interruption obtaining flag.

This shows that the I/O interruption of the guest I/O apparatus corresponding to this entry necessiates special processing. In the prior art, the bit is set by the host and utilizes a switch for entering into a special processor routine. In the present invention the I/O interruption obtaining flag within the corresponding GST is copied by the hardware upon an issuance of the STUPG instruction and the I/O interruption corresponding to this entry is obtained by the host.

Control field bit 2-7 . . . unused field

Control field bit 8-15 . . . guest identification

This field describes the guest identification of the guest using the physical subchannel corresponding to this entry.

Guest I/O identification is transmitted to the guest upon a generation of a guest I/O interruption.

Upon the I/O interruption, the identification data of the interruption producing apparatus which is translated to the physical subchannel number by the ATT is translated to the identification of the guest plus the identification of the guest I/O apparatus by the VATT. Upon the I/O interruption, if the corresponding guest is not operating, in the prior art the interruption condition is maintained inside the host itself by software. However, in this invention, the interruption condition is maintained in the hardware. In the prior art, the software method is used and a flag designates that an interruption condition is held in the host for a guest in the control information for the guest being used by the host. Furthermore, upon a setup of the guests or upon the issuance of the I/O mask control instruction by the guest the host needs to perform a special monitoring. In the present invention this monitoring is conducted by the hardware. Thus, monitoring conducted by the software is not necessary. According to this control, the hardware obtains a plurality of subchannels for the same apparatus. Thus, where an apparatus is commonly used by a plurality of guests, the above control becomes possible because the interruption condition can be maintained in the physical subchannel of a management unit of the hardware.

The input and output processes of the present invention in a virtual computer system, with the hardware structure characterized as stated above, will be explained as follows.

(a) Upon an execution of the input and output instruction for the guest:

(1) when a guest 101 or 102 is set up by a host 103, the guest input and output configuration designated by the user is formed as the guest subchannel translation table (GST)(for example 214) by the host 103.

Next, the virtual address translation table (VATT) (for example 216) is formed on the exclusive hardware area or hardware system area (HSA) of main storage unit (MSU) 203 from guest subchannel translation table (GST) 214 by hardware 104. Then, based on two translation data (D) (GST, VATT), it dynamically obtains a physical subchannel (SCH) (for example 031)(control block group (E)).

At this time, one physical input and output address is not made to correspond to a plurality of subchannels (SCH).

(2) When the guest input and output instruction is issued by the setup guest, the guest subchannel number (virtual identification (B)) of the operand of the instruction is translated to the physical subchannel number (physical identification (C)) by the guest subchannel translation table (GST) 214 and physical subchannel (SCH) 031 is initiated without going through host 103.

Then only the input and output path assigned to the initiated guests 101 or 102 is used. For example, the only path which can be used for the input and output process is via a channel (CHE) 208-input and output control apparatus (IOC) 210-input and output apparatus (IOD) 105.

(b) Upon an issuance of interruption of the guest input and output:

(1) Hardware 104 obtains physical subchannel (SCH) 031 corresponding to input/output apparatus (IOD) 105 and reports the input/output interruption condition by referring to address translation table (ATT) 207 within input/output process apparatus (IOP) 206.

(2) The physical subchannel number (physical identification (C)) corresponding to the obtained physical subchannel (SCH) 031 is translated to a guest subchannel number (virtual identification (B)) by referring to the virtual address translating table (VATT) 216, by hardware 104, and directly produces an input/output interruption for the corresponding guest 101 or 102 without going through the host.

Next, the guest control/setup according to the present invention will be explained.

A guest setup is performed by a STUPG instruction (set up guest) issued by the host. The operand of the STUPG instruction is GSCB (guest state control block) as shown in FIG. 9. The STUPG instruction uses the head address of the GSCB as the operand. The total content is written by the host upon issuance of an STUPG instruction. Those of the bit included in the guest process field which are related to the present invention are as follows.

Bit 0 . . . guest I/O process direct execution.

When this bit is 1, the hardware accesses the contents of the GST by using the GST head address and the GST entry number recited in the GSCB as a portion of the STUPG instruction process and the hardware obtains the physical subchannel by using the data designated there. Namely, the path designating data of bits 8-15 of the GST entry is added to the basic data obtained by the physical I/O apparatus identification data with regard to all the data in which bit 0 in the GST entry is 1. Thus, the physical subchannel is formed and the subchannel number is written in bytes 4 to 5 of the GST entry.

The GSCB has to be resident in the host absolute address space until SCRTG (scratch guest) instruction closing the guest is issued by the host. When the hardware detects the event to be reported to the host with regard to the guest operation, the host acquisition occurs. Then, the area corresponding to respective guest CPUs in the GSCB is used as areas for saving state of the guest and for loading the inside state which is previously saved, where SGSTC (start guest CPU) instruction is issued as an instruction for running the guest.

The hardware accesses the GST when the SCRTG instruction is issued and the physical subchannel recited inside and obtained for the guest is released.

Figure 10:
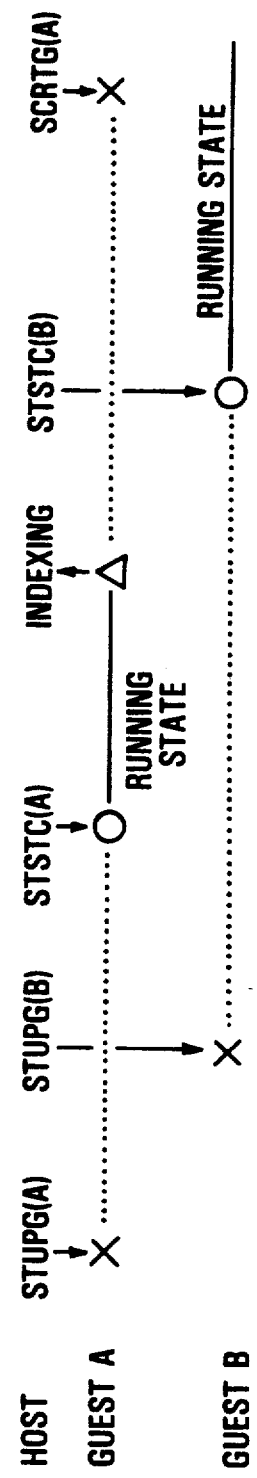
FIG. 10 is a flowchart of the operation of a guest A, a guest B, and a host.

The whole flow is shown in FIG. 10. A guest exists during the period designated by the dot or the line. Guest A or B, is in the running state only for the portions designated by the line.

Next, FIG. 11 shows an example of the subchannel format according to the present invention. In the drawing, respective rows corresponding to words and respective words are divided into fields in units of one byte. The meanings of the respective fields are as follows.

Word 0, Byte 0 . . . lock byte

The subchannel necessiates an exclusive control as it is renewed by a plurality of units such as an IOP/CPU.

Therefore, an exclusive hardware structure is provided, which uses this lock byte.

Word 0, Byte 1-2 . . . internal state designation

The data concerning the present invention is as follows.

Byte 1, Bit 0 . . . virtual computer access mode

When this bit is 1, the guest identification of Word 2, Byte 0 becomes effective, CCW (channel command word), data and IDAW access which are conducted by this subchannel, are accompanied by the designation that they must be the process object of the virtual computer address translating structure provided by the MCU, and the IOP issues the request. When the bit is 0, an address translation is not requested for the MCU.

Byte 1, bit 1 . . . host transmission designation flag

This is a switch by which the CPU checks whether the host interruption condition is established in all the CPU side processes (I/O instruction and I/O interruption) using the subchannel. This bit is set when the bit 1 or 2 in the corresponding GST entry is set by the host. When this bit is 0, checking is not performed.

Word 0, Byte 3 . . . UA (Unit address)

This is an address for selecting this apparatus on the channel interface. It is transmitted to a channel interface by IOP and used to form a data exchange with the apparatus.

Word 1 forward and backward direction queue pointer

This is a connection pointer activated upon a connection to an interruption queue or I/O process queue.

Word 2, Byte 0 . . . guest identification

This is used for selecting an interruption object CPU, for determining whether or not interruption is possible, or for determining to which guest space the data should be transferred upon a data transfer.

Word 2, Byte 1 . . . connection path designation data

The path which this subchannel is capable of using is designated. The path designation shows by bit to bit correspondence which path in a path group recited in Word 2, Bytes 2 to 3 is used the path group comprising a maximum of 8 paths. In this case, a group of channels may be considered as a path group. This 1-byte data shows to which path among the group this apparatus is connected.

One physical subchannel corresponding to one guest I/O identification may be connected to a plurality of paths.

As recited above, according to the present invention, in an ordinary process of a guest input/output instruction or an input/output interruption, an aid by the host is not necessary and host overheads in the input/output processes, the problem of the prior art, can be greatly decreased.

Thus, according to the present invention, in the input/output process system for respective virtual computers in a virtual computer system, based on the data block (a) describing the input/output structure of respective guest designated by the user translation data (D) describing the relation between the guest subchannel number (B) recognized by the guest and the physical subchannel number (C) actually used by the hardware is provided to the hardware. For example, the translation data comprising the guest subchannel translating table (GST) and the virtual address translating table (VATT) are generated by the host and hardware and provided to the hardware. Thus the hardware dynamically obtains for itself the physical subchannel (SCH) necessary for executing the input and output process of the corresponding guest. Where the virtual input and output instruction is issued by the guest, the guest subchannel translating table identifies the subchannel (SCH) necessary for the input and output process and the hardware executes the input and output instruction. Where input and output interruption is generated by the input and output apparatus (IOD), the hardware identifies the guest based on the virtual address translating table (VATT), thereby enabling the guest to produce an input and output interruption.

Therefore, the control data within the hardware, namely, the structure for dynamically setting up the subchannel (SCH) in accordance with the guest and the translation structure (GST, VATT) between the guest input/output structure and the physical input/output structure, are provided in the hardware and this enables the input/output process to be executed, although the guest input/output process is not provided on the host, thereby decreasing the overhead of the host.

The present invention also discloses an interruption process control system in the input/output process in a virtual computer system to decrease the load of the virtual computer monitor.

Figure 2:
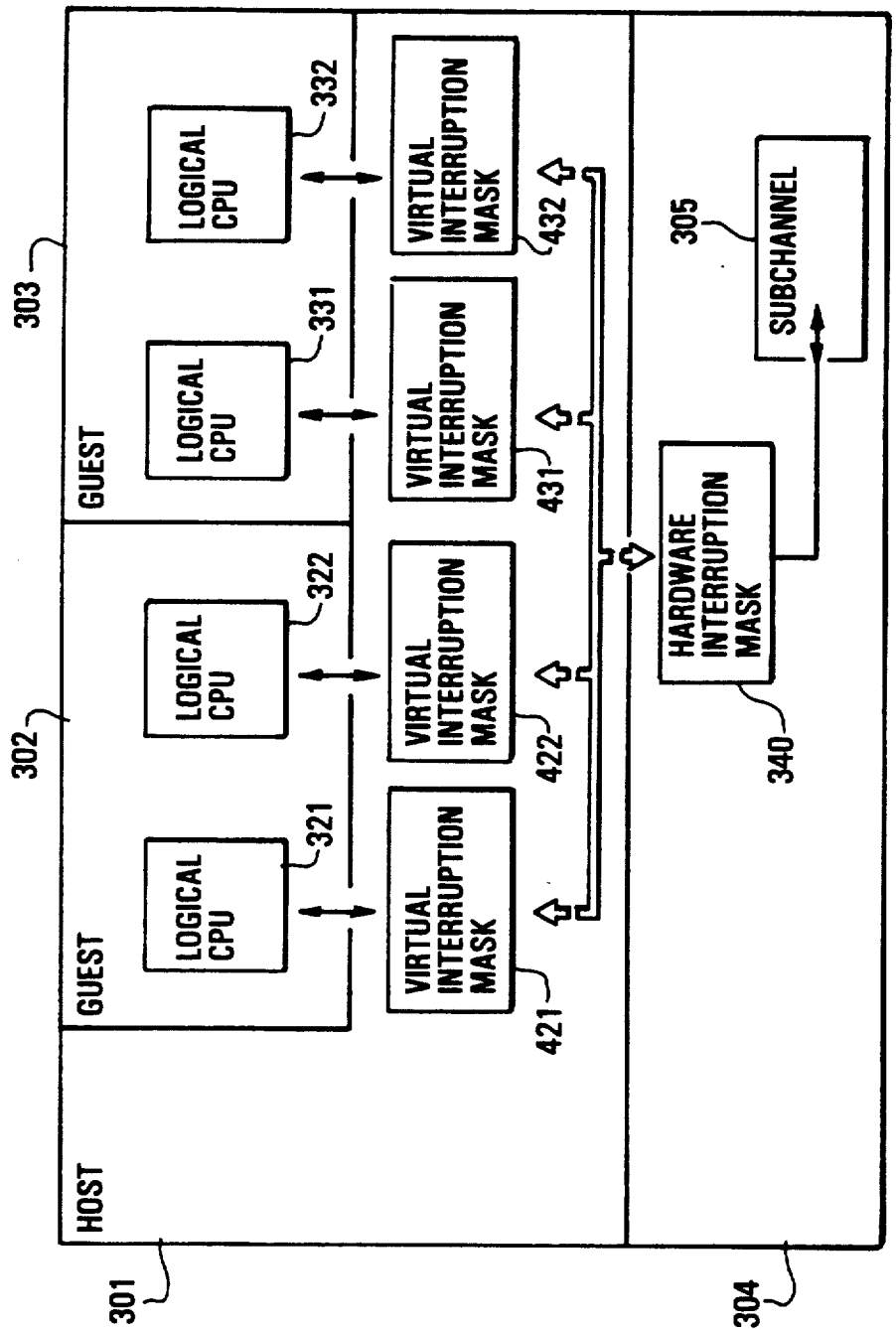
FIG. 2 is a block diagram of the input and output interruption system of the prior art virtual computer system.
Figure 3:
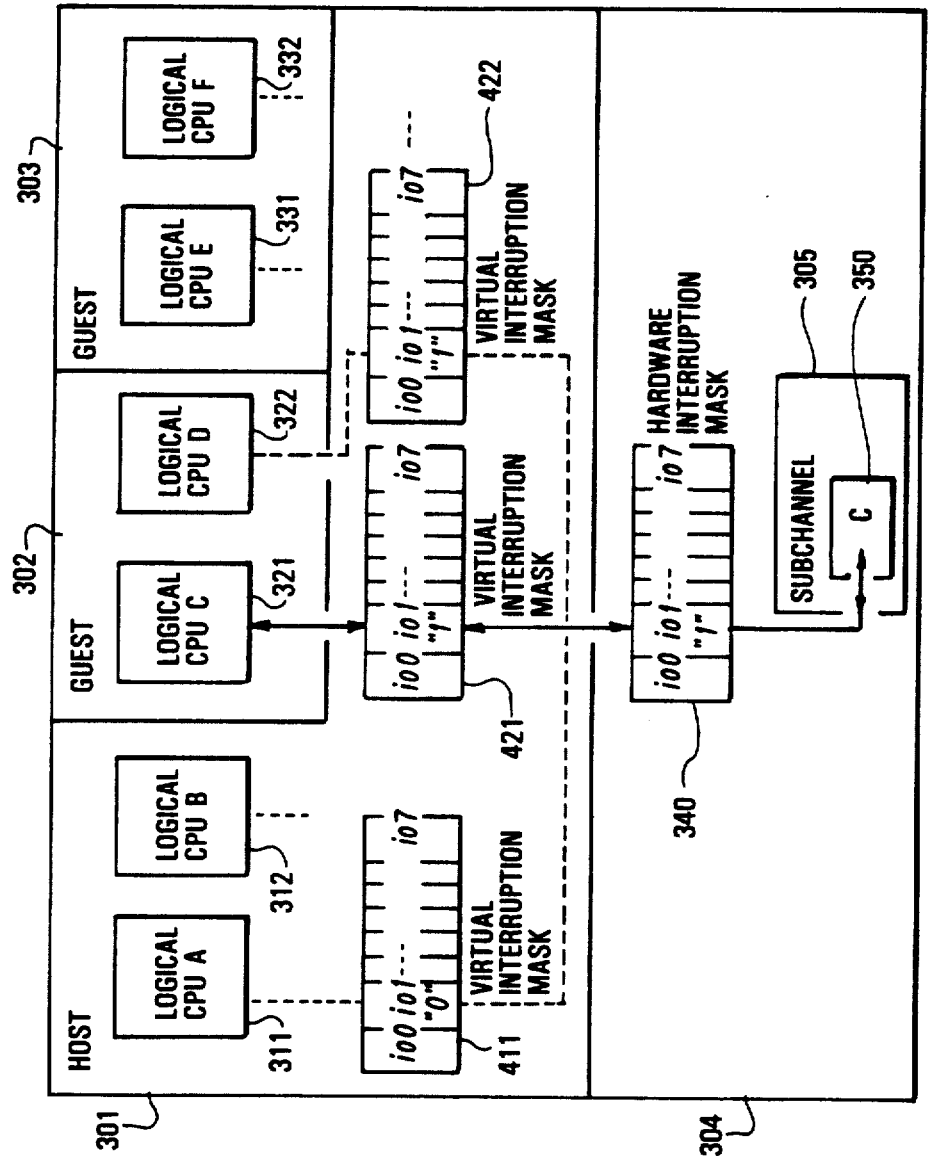
FIG. 3 is a block diagram for explaining the interruption control of the prior art virtual computer system.
Figure 12:
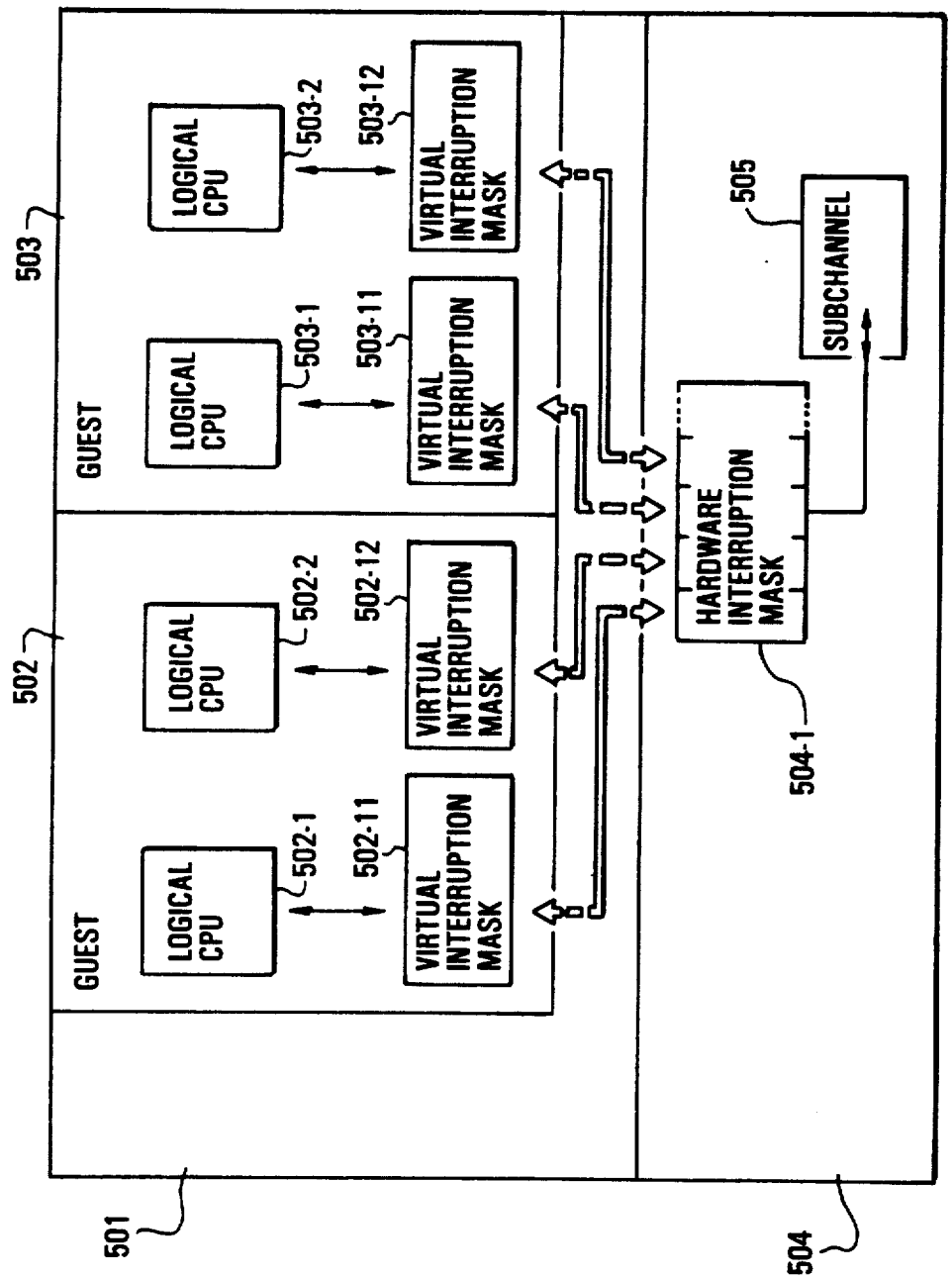
FIG. 12 a block diagram showing the principle of another embodiment of the present invention.

FIG. 12 shows the principle structure of another embodiment of the present invention. It comprises a host 501; guests 502 and 503; logical CPUs 502-1, 502-2, 503-1, 503-2; virtual interruption masks 502-11, 502-12, 503-11 and 503-12; hardware 504; hardware interruption mask 504-1; and subchannel 505. Virtual interruption masks 502-11, 502-12, 503-11 and 503-12 are provided for respective logical CPUs in a similar manner to the prior art shown in FIGS. 2 and 3 and respective bits correspond to interruption requests from different I/O apparatuses. I/O interruption is received only when the bit value is "1". Hardware interruption mask 504-1 is different from that of the prior art and respective mask bits are made to correspond to respective logical CPUs.

According to the process assignment or distribution of the present invention, the host does not perform a distribution of the I/O interruption in ordinary cases. The I/O interruption is directly reported to respective logical CPUs without going through the distribution process by the host. Respective bits of the hardware interruption mask 504-1 correspond to respective logical CPUs and are reported to the logical CPUs by using mask bits corresponding to the interruption report destination CPU described in the I/O interruption subchannel.

Figure 13:
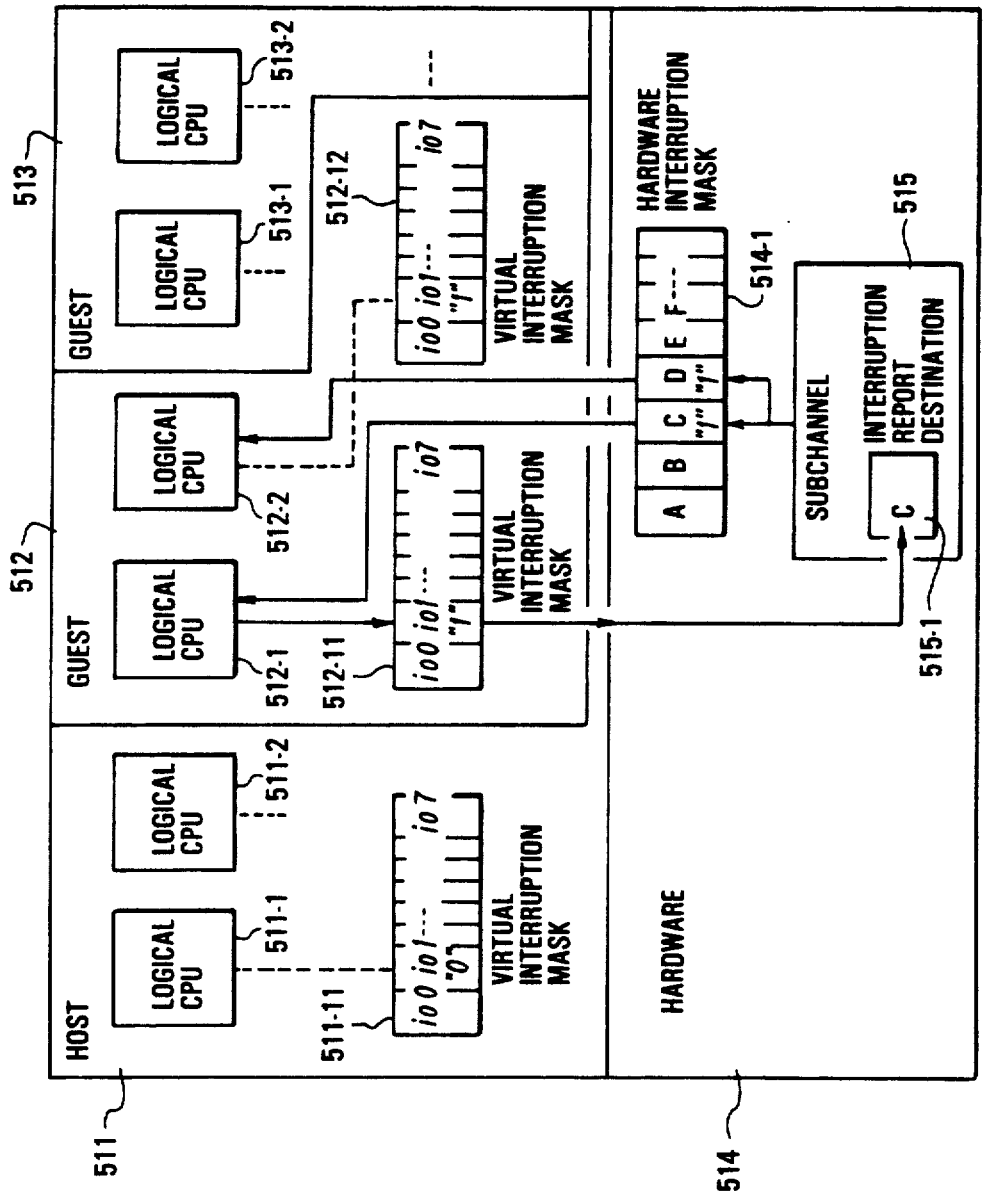
FIG. 13 is a block diagram of another embodiment of the present invention.

FIG. 13 shows an embodiment of the present invention. The embodiment comprises host 511; guests 512 and 513; logical CPUs a/f 511-1, 511-2, 512-1, 512-2, 513-1 and 513-2; respective virtual interruption masks 511-11, 512-11 and 512-12; hardware 514; hardware interruption mask 514-1; subchannel 515; and interruption reporting destination 515-11. Virtual interruption masks 511-11, 512-11 and 512-12 are provided for respective logical CPUs and respective bits correspond to interruption request from the I/O apparatus. The I/O interruption is received only when the value of the bit is "1".

Respective mask bits of hardware interruption mask 514-1 correspond to logical CPUs in a one-to-one relation. The I/O interruption is reported only for the logical CPU having the correspond mask bit value of "1".

The I/O interruption report destination logical CPU is described in the interruption report destination 515-1. The logical CPU for setting the virtual interruption mask bit corresponding to the I/O apparatus concerning the subchannel as "1" is selected as the report destination logical CPU.

The operation of the present invention will be explained separately upon setting of the virtual interruption mask and upon generation of the guest I/O interruption.

(a) Upon setting of the virtual interruption mask:

(1) Upon setting the virtual interruption mask, guest logical CPU-C (512-1) sets the virtual interruption mask 512-11 when required. By making the value of the bit, for example, (i01), corresponding to the I/O apparatus "1", the interruption request from subchannel 515 corresponding to the I/O apparatus can then be received.

(2) Host 511 sets the bit C of the hardware interruption mask 514-1 to correspond to the guest logic CPU-C as "1" and sets the logical CPU-c, setting the mask bits most recently as the interruption report destination at 515-1.

(3) Following the above operation, a certain guest logical CPU (for example 512-2) sets the bit i01 of the virtual interruption mask 512-12 as "1" and then D is set in the interruption report destination 515-1 in the subchannel by the hardware. Thereafter the interruption request from the subchannel is reported to the guest logical CPU-D.

(4) When a certain guest logical CPU (for example 512-2) is dispatched to a different physical CPU, the host reflects the value of the corresponding bit D of the hardware interruption mask 514-1 which is used up to that time, on a different physical CPU hardware interruption mask.

(b) Upon a generation of the guest I/O interruption:

(1) Where the I/O apparatus generates the interruption condition, the report destination C is selected based on the content of the interruption report destination 515-1.

(2) When the bit C of the hardware interruption 514-1 corresponding to the guest logical CPU-C (512-1) is "1", the I/O interruption condition is reported to the logical CPU-C.

According to the present embodiment, respective bits of the hardware interruption mask are made to correspond to respective logical CPUs. In addition, the hardware interruption mask of the running physical CPU which corresponds to the logical CPU is made to enable, thereby making it unnecessary for the host to operate, which may be accompanied by the time divisional usage of the hardware interruption mask. The relationship information with logical CPU to be written into respective subchannels is dynamically changed to the relationship information corresponding to the logical CPU which most recently executes the mask bit change operation capable of receiving the interruption condition from the subchannel, thereby facilitating a floating interruption process from the input/output apparatus.

As described above, the host need not distribute the I/O interruption request among logical CPUs, but can determine the interruption report destination in accordance with the bit position of the hardware interruption mask. Therefore, the overhead in the host process in the I/O interruption process which causes the problem in the prior art can be greatly decreased.

What is claimed is:

1. A virtual computer control system having an information block describing an input/output (I/O) apparatus structure to be provided to a plurality of virtual computers, in which one of the virtual computers issues an input/output instruction including a virtual identifier of a subchannel to an I/O processor, and performs and input/output process on an I/O unit when said instruction is received by said I/O processor, comprising:

virtual computer monitor means for monitoring generation and annihilation of said virtual computers and for providing translation information describing a relationship between the virtual identifier of the input/output apparatus structure to be recognized by said virtual computers and a physical identifier actually used in a physical subchannel;

first hardware means for dynamically determining an inner-hardware control block group necessary for performing an input/output process of said virtual computers based on said information block and said translation information when said virtual computer monitor means provides said translation information to said first hardware means, second hardware means for translating the virtual identifier included in the input/output instruction issued by the one of the virtual computers to the physical identifier based on the translation information and for identifying one control block of the inner-hardware control block group to perform the input/output process using said control block, and third hardware means for translating the physical identifier of said control block obtained by said second hardware means to the virtual identifier to be used by the one of the virtual computers when an input/output interruption is generated by an input/output apparatus to provide the input/output interruption to the one of the virtual computers using the virtual identifier.

2. The virtual computer control system according to claim 1, wherein said virtual computer monitor means is a host, each of said virtual computers is a guest, said virtual identifier is a guest subchannel number, said physical identifier is a subchannel number, and said inner-hardware control block group comprises subchannels.

3. The virtual computer control system according to claim 2, wherein said second hardware means includes means for performing an address translation operation of the guest subchannel number and a head address of a guest state control block which is an operand of a setup guest instruction, for selecting an entry from a guest subchannel translation table and a guest state control block table which is one portion of said translation information and for reading a physical subchannel number and physical input/output identification located in said guest subchannel translation table.

4. The virtual computer control system according to claim 3, wherein the entry of the guest subchannel translation table comprises a control field, the physical input/output identification and the physical subchannel number, said control field including effective flags respectively designating whether said first hardware means can obtain the subchannel number upon an issuance of the setup guest instruction, whether the host obtains a guest input/output instruction, and whether input/output interruption is obtained, and a field for designating a path to obtain and set the subchannel.

5. The virtual computer control system according to claim 3, wherein said second hardware means includes means for accessing the physical subchannel number by referring to the guest state control block and guest subchannel translation tables based on a guest subchannel number and the guest state control block.

6. The virtual computer control system according to claim 3, wherein said second hardware means includes means for accessing the guest subchannel translation table entry corresponding to a guest input/output identification by referring to the guest state control block and guest subchannel translation tables based on the guest subchannel number and the guest state control block upon an issuance of the guest input/output instruction and when the control field within the entry identifies host use, and wherein the state of the guest comprising a program counter of a central processing unit and internal registers are saved in an internal state saving area in the guest state control block and thereafter the host computer is interrupted by using guest central processing unit identification and when the control field does not show the host computer use, the physical subchannel identification recited in the guest subchannel translation table is obtained.

7. The virtual computer control system according to claim 2, wherein said third hardware means includes means for providing interruption generation apparatus identification data obtained upon the issuance of the input/output interruption by the input/output apparatus, to an address translation table and for obtaining a displacement from the head address of a virtual address translation table which is one portion of said translation information, based on the physical subchannel number obtained from the entry of the address translation table, for reading the guest identification and guest input/output identification from the entry of the virtual address translation table based on the displacement from the head address, and resulting in generating the input/output interruption to said guest.

8. The virtual computer control system according to claim 7, wherein said virtual address translation table is formed using the entry of the guest translation table as an input.

9. The virtual computer control system according to claim 7, wherein said virtual address translation table comprises a control field comprising an effective flag for determining whether the input/output interruption is obtained from the host and an input/output interruption flag indicating a special processing by the host computer; and wherein said virtual computer control system further comprises means for calculating an address necessary for obtaining the entry from said virtual address translation table based on the subchannel number translated from the identification data of the input/output apparatus converted to the physical subchannel number by said virtual address translation table upon the issuance of the input/output interruption, for determining whether the input/output interruption should be made by the host based on said effective flag and for driving the guest input/output identification from said virtual address translation table.

10. The virtual computer control system according to claim 1, wherein said first, second and third hardware means comprise first, second and third sequencers, respectively, said second sequencer operatively connected to said first sequencer and said third sequencer operatively connected to said second sequencer.

11. A virtual computer control system having an information block describing an input/output (I/O) apparatus structure to be provided to a plurality of virtual computers, in which one of the virtual computers issues an input/output instruction which includes a virtual identifier of a subchannel to an I/O processor, and performs an input/output process on an I/O unit when said input/output instruction is received by said I/O processor, comprising:

virtual computer monitor means for monitoring generation and annihilation of said virtual computers and for providing translation information describing a relationship between a virtual identification of the input/output apparatus structure to be recognized by said virtual computers and a physical identifier actually used in a physical subchannel, and hardware means, including:

means for dynamically determining an inner hardware control block group necessary for performing an input/output process of said virtual computers based on said information block and said translation information when said virtual computer monitor means provides said translation information to said hardware means, means for translating the virtual identification included in the input/output instruction issued by the one of the virtual computers to the physical identification based on the translation information and for identifying one control block of the inner-hardware control block group, to perform the input/output process using said control block, and means for translating the physical identification of said control block obtained by said means for translating to the virtual identification to be used by the one of the virtual computers when an input output interruption is generated by input/output apparatus to provide the input/output interruption to the one of the virtual computers using the virtual identification.

12. A method for controlling a virtual computer system having an information block describing an input/output apparatus structure to be provided to a plurality of virtual computers, in which one of the virtual computers issues an input/output instruction which includes a virtual identifier of a subchannel to an I/O processor, and performs an input/output process of an I/O unit when said input/output instruction is received by said I/O processor, comprising steps of:

monitoring generation and annihilation of said virtual computers and providing translation information describing a relationship between the virtual identifier of the input/output apparatus structure to be recognized by said virtual computers and a physical identifier actually used in a physical subchannel, dynamically determining an inner-hardware control block group necessary for performing an input/output process of said virtual computers based on said information block and said translation information, translating the virtual identifier included in the input/output instruction to the physical identifier based on the translation information and for identifying one control block of the inner-hardware control block group to perform the input/output process using said control block, and translating the physical identifier of said control block to the virtual identifier to be used by the one of the virtual computers when an input/output interruption is generated to provide an input/output interruption to the one of virtual computers using the virtual identifier.

* * * * *